(12) United States Patent
Chen et al.

(10) Patent No.: US 11,879,872 B2
(45) Date of Patent: Jan. 23, 2024

(54) DEFORMATION AND CONTROL SIMULATION TEST SYSTEM FOR TUNNEL ENGINEERING SUPPORTING STRUCTURE

(71) Applicant: INSTITUTE OF ROCK AND SOIL MECHANICS, CHINESE ACADEMY OF SCIENCES, Hubei (CN)

(72) Inventors: Weizhong Chen, Wuhan (CN); Xianjun Tan, Wuhan (CN); Chaoxuan Zhang, Wuhan (CN); Hongming Tian, Wuhan (CN); Yunlong Gu, Wuhan (CN); Xiaomei Wang, Wuhan (CN); Zhengrong Shi, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 0 days.

(21) Appl. No.: 18/136,536

(22) Filed: Apr. 19, 2023

(65) Prior Publication Data
US 2023/0349799 A1    Nov. 2, 2023

(30) Foreign Application Priority Data
Apr. 29, 2022   (CN) .......................... 202210466303.7

(51) Int. Cl.
*G01N 3/02* (2006.01)
*G01N 3/08* (2006.01)
(Continued)

(52) U.S. Cl.
CPC ................ *G01N 3/08* (2013.01); *G01N 3/02* (2013.01); *G01N 2203/006* (2013.01);
(Continued)

(58) Field of Classification Search
CPC .......... G01N 19/00; G01N 3/12; G01N 33/00; G01N 33/24; G01N 3/56; G01N 3/06;
(Continued)

(56) References Cited

FOREIGN PATENT DOCUMENTS

| CN | 101435746 A | 5/2009 |
|---|---|---|
| CN | 201352179 Y | * 11/2009 |

(Continued)

OTHER PUBLICATIONS

Dec. 5, 2022 Office Action issued in Chinese Patent Application No. 202210466303.7.
(Continued)

*Primary Examiner* — Brandi N Hopkins
(74) *Attorney, Agent, or Firm* — Oliff PLC

(57) ABSTRACT

The present disclosure discloses a deformation and control simulation test system for a tunnel engineering supporting structure, including a follow-up hoisting platform, actuators, a control system. It is horizontal structure. The follow-up hoisting platform reduces the friction caused by the weight of testing sample and facilitates experimental operations. Each actuator fixed on an annular box body reaction frame can move independently through a control system in form of force control or displacement control mode, and can achieve circumferential contraction loading through its gomphodont configuration. The hinged and curved design of the cushion blocks of actuators can adapt to the circumferential contraction deformation of a test sample and maintain a close fit with them during the loading process. The present disclosure provides a good solution for physical model tests on deformation and control of tunnel engineering supporting structures including uniform loading, non-uniform loading, and long-term loading conditions.

10 Claims, 4 Drawing Sheets

(51) Int. Cl.
*G01M 99/00* (2011.01)
*G05B 19/04* (2006.01)

(52) U.S. Cl.
CPC .............. *G01N 2203/0019* (2013.01); *G01N 2203/0042* (2013.01); *G01N 2203/0262* (2013.01)

(58) Field of Classification Search
CPC .... G01M 99/007; G01M 10/00; G01M 99/00; G01M 13/00; G01D 21/02; G01B 21/32; E21D 9/003; E21D 9/06; E21D 9/08
See application file for complete search history.

(56) References Cited

FOREIGN PATENT DOCUMENTS

| CN | 102095595 | A |   | 6/2011 |   |
|----|-----------|---|---|--------|---|
| CN | 105092275 | A |   | 11/2015 |   |
| CN | 109632307 | A |   | 4/2019 |   |
| CN | 110618037 | A |   | 12/2019 |   |
| CN | 110823612 | A |   | 2/2020 |   |
| CN | 211602708 | U |   | 9/2020 |   |
| CN | 112595533 | A | * | 4/2021 | .......... G01M 99/007 |
| GB | 2 127 562 | A |   | 4/1984 |   |
| JP | H05-288649 | A |   | 11/1993 |   |
| JP | H11-22390 | A |   | 1/1999 |   |

OTHER PUBLICATIONS

Hongxia Peng et al., "Design of Channels Technology of Shield-bored Tunnels of Nanjing Metro," Urban Rapid Transit, pp. 105-110, May 10, 2021.

* cited by examiner

DEFORMATION AND CONTROL SIMULATION TEST SYSTEM FOR TUNNEL ENGINEERING SUPPORTING STRUCTURE

TECHNICAL FIELD

The present disclosure belongs to the field of underground engineering such as tunnels and roadways, and in particular to a deformation and control simulation test system for a tunnel engineering supporting structure.

BACKGROUND

In the field of underground engineering such as tunnels and roadways, a large-scale physical model test device in a certain similar proportion is used to approximately simulate the load and deformation of a tunnel supporting structure under actual working conditions. This is one of the important means to study mechanical properties, safety and durability of a tunnel lining structure. In the past, a model test loading system with a sand (soil) box as a main body was mostly used to approximately simulate surrounding rock and certain geo-stress conditions. With the emergence of some new types of yielding supporting structures, such as laying a buffer layer between the initial support and the lining, and setting compressible units in the circumferential direction of the initial support structure. These supporting structures will experience large-scale contraction deformation under loading. This requires the test system to be compatible with the buffering deformation of the measured support structure, and the internal forces and displacements can be accurately obtained.

The existing model test machines have the following problems:

(1) It is difficult to achieve accurate loading and displacement control under a circumferential contraction deformation mode of a tunnel supporting structure, especially accurate loading and large-deformation displacement control under biased conditions and long-term loading condition.

(2) A loading system with the soil (sand) box as the main body is prone to dust pollution, and takes long time in preparation for a single test.

(3) Most of the existing model test loading systems use a vertical structure, which is not conducive to personnel safety during aerial work.

(4) The existing model test loading systems have a single loading function and is usually manually controlled. A load and deformation of a structure to be tested are studied by manually reading test results of components such as a pressure box and a micrometer, leading to a low automation degree.

SUMMARY

For the shortcomings in the prior art, the present disclosure aims to provide a deformation and control simulation test system for a tunnel engineering supporting structure. This device can solve the above technical problems.

In order to achieve the above objectives, the present disclosure adopts the technical solution as follows:

A deformation and control simulation test system for a tunnel engineering supporting structure is of a horizontal structure, and includes a follow-up hoisting platform; a plurality of actuators are arranged at a periphery of the follow-up hoisting platform; each actuator includes a loading cushion block and a driving device; two sides of each loading cushion block are gomphodont parts; adjacent loading cushion blocks are plugged to each other through the gomphodont parts; the driving devices drive the loading cushion blocks to load a test sample; the driving devices are fixed on an annular box body reaction frame; and the driving devices are connected with a control system.

As a further technical solution, a loading surface of each loading cushion block is a curved surface; and a curvature of the curved surface is equal to an average value of an initial curvature of the test sample and a predicted curvature after ultimate compression deformation.

As a further technical solution, a surface, opposite to the loading surface, of each loading cushion block is connected with an output end of each driving device through a spherical hinge.

As a further technical solution, two sides of each driving device are provided with guide rods for guiding a loading direction of the driving device.

As a further technical solution, the driving device is a hydraulic driving device or a pneumatic driving device.

As a further technical solution, the annular box body reaction frame includes a plurality of portions; adjacent portions are welded together; and actuator mounting holes are reserved in the portions.

As a further technical solution, the follow-up hoisting platform includes a top plate and a bottom plate; several universal balls are inlaid in the bottom plate; the top plate is supported by the several universal balls; and the top plate is used for bearing the test sample.

As a further technical solution, a top plate alignment device is also arranged on the bottom plate.

As a further technical solution, a test sample alignment device is also arranged on the top plate.

As a further technical solution, the control system can realize uniform loading, non-uniform loading, and long-term loading.

The embodiments of the present disclosure have the following beneficial effects:

(1) The horizontal structure used in the test system is convenient to hoist and calibrate, and effectively reduces a working height in a test process with high safety.

(2) According to the test system, a plurality of pairs of independently programmable and controllable actuators are provided, which can meet loading requirements for circumferential contraction deformation of a tunnel buffer layer supporting structure under working conditions such as uniform loading, biased loading, and long-term loading. The loading control system can support touch screen human-machine interaction operations.

(3) For conventional circumferential loading mechanical tests, the present disclosure adopts a special configuration design of the loading cushion blocks. The two sides of each loading cushion block are the gomphodont parts, and the adjacent loading cushion blocks are plugged together through the gomphodont parts, such that when the device is pushed, the adjacent loading cushion blocks are interposed and embedded into each other through finger seams, which avoids the mutual collision of conventional loading cushion blocks during contraction loading, thereby achieving circumferential contraction loading.

(4) In the present disclosure, the loading cushion blocks are hinged to the driving devices. In the test process, when a lining ring or buffer layer of a tunnel to be tested undergoes local deformation, hinge pieces can assist the loading cushion blocks to deviate left or right in a certain angle, thereby maintaining close contact with the test sample to be tested in the loading process.

(5) Compared with a conventional sand (soil) box, the test system has a relatively hygienic process, is not prone to dust pollution, and is easy to prepare for test.

(6) A floating platform in the test system adopts a structural form of the follow-up hoisting platform, which effectively reduces the impact of friction between the test sample to be tested and a base on test results. At the same time, the follow-up hoisting platform can facilitate the preparation, transferring and hoisting of the lining ring and the buffer layer.

(7) The annular box body reaction frame used in the test system can convert a test load into an internal force of the supporting structure, which effectively avoids the impact of the test load on a laboratory foundation.

(8) Internal and external ladders and inspection platforms can facilitate operators to carry out test operations and safe maintenance operations.

BRIEF DESCRIPTION OF THE DRAWINGS

The accompanying drawings constituting a part of the present disclosure are used for providing a further understanding of the present disclosure. The exemplary examples of the present disclosure and descriptions thereof are used for explaining the present disclosure, and do not constitute an improper limitation of the present disclosure.

Figure 1:
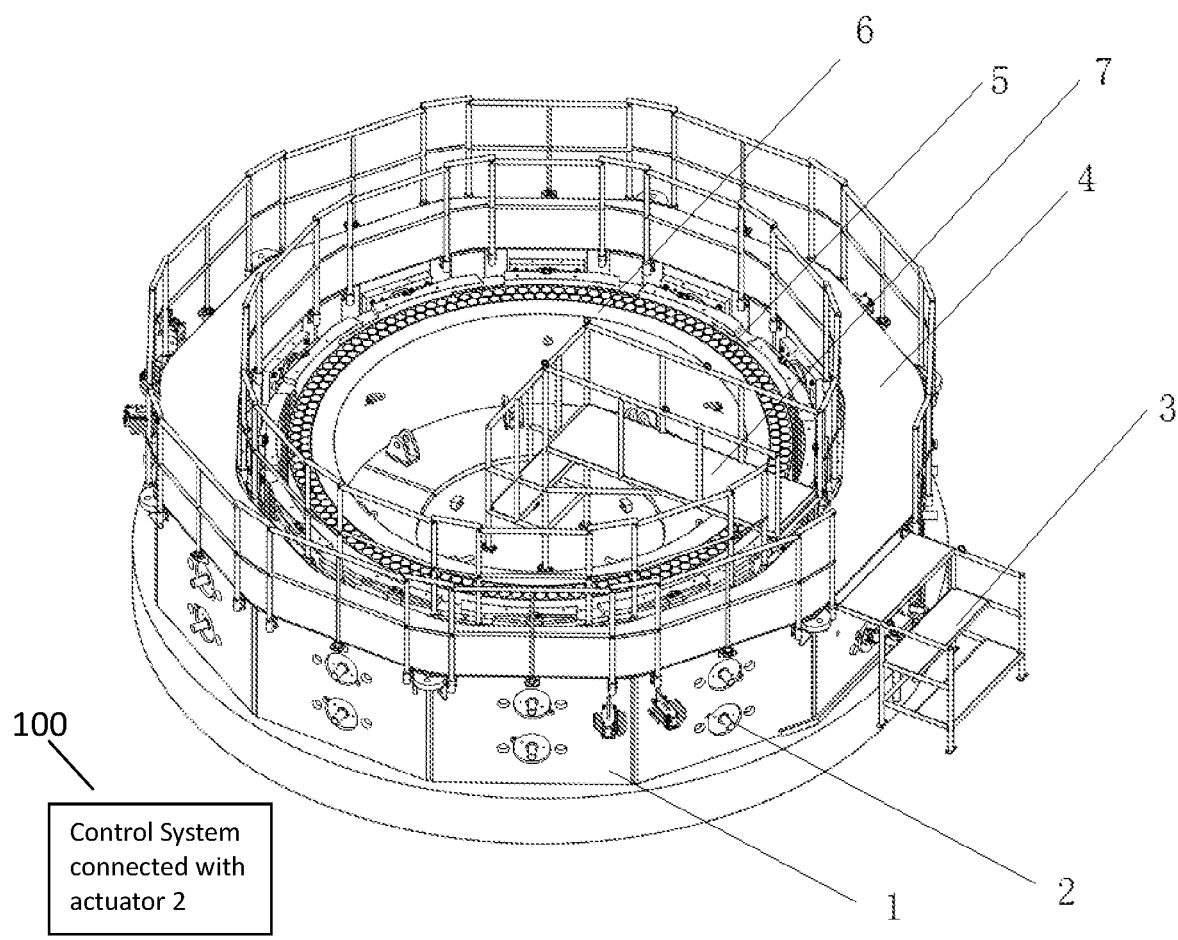
FIG. 1 is a schematic diagram of an overall structure of the present disclosure.

In the accompanying drawings: The spacings or sizes between parts are enlarged to show the positions of the parts, and the schematic diagrams are only for illustrative purposes.

1: annular box body reaction frame, 2: actuator, 3: external ladder, 4: inspection and protection platform, 5: buffer layer, 6: lining ring, 7: internal ladder; 8: floating platform, and 9: foundation.

1-1: driving oil cylinder mounting hole, and 1-2: driving oil cylinder mounting hole.

2-1: oil cylinder, 2-2: guide rod, 2-3: loading cushion block, 2-4: spherical cylinder, 2-5: annular box body reaction frame part device; and 2-6: connecting plate.

6-1: universal lifting ring.

8-1: bottom plate, 8-2: top plate, 8-3: universal ball, 8-4: top plate alignment device, 8-5: lining ring alignment device, 8-6: universal ball welding plate, and 8-7: lifting lug.

DETAILED DESCRIPTION

It should be pointed out that the following detailed descriptions are all illustrative and are intended to provide further descriptions of the present disclosure. Unless otherwise specified, all technical and scientific terms used in the present disclosure have the same meanings as usual understandings of a person of ordinary skill in the art to which the present disclosure belongs.

It should be noted that the terms used herein are merely used for describing specific implementations, and are not intended to limit exemplary implementations of the present disclosure. As used herein, the singular form is intended to include the plural form, unless the context clearly indicates otherwise in the present disclosure. In addition, it should further be understood that terms "include" and/or "including" used in this specification indicate that there are features, steps, operations, devices, components, and/or combinations thereof.

For convenience of description, the words "above", "below", "left" and "right" only indicate directions consistent with those of the accompanying drawings, are not intended to limit the structure, and are used only for ease and brevity of illustration and description, rather than indicating or implying that the mentioned device or element needs to have a particular orientation or needs to be constructed and operated in a particular orientation. Therefore, such terms should not be construed as a limitation on the present disclosure.

As introduced in the background, the prior art has disadvantages. The present disclosure aims to provide a deformation and control simulation test system for a tunnel engineering supporting structure to solve the above technical problems.

In a typical implementation of the present disclosure, as shown in FIG. 1 to FIG. 8, the deformation and control simulation test system for the tunnel engineering supporting structure disclosed in this embodiment adopts a horizontal structure overall. Compared with a vertical structure, in which a floating platform of the vertical structure has a large volume, is heavy, and has a high-level center of gravity, the horizontal structure has a low-level center of gravity and high safety. In the vertical structure, it is difficult to hoist, place, and align a lining ring test sample, while in the horizontal structure, it is easy to hoist, place and align the test sample. In the vertical structure, maintenance, measurement, inspection, and the like are all aerial work, which accordingly requires a lifting operation platform, while those are easy in the horizontal structure.

A main unit portion of a loading test bench disclosed in this embodiment is composed of an internal ladder 7, an external ladder 3, an inspection and protection platform 4, an annular box body reaction frame 1, a plurality of actuators 2, a floating platform 8, and the like. A lining ring 6 (a test sample) is fixed on the floating platform 8. A buffer layer 5 (a test sample) is arranged on an outer circle of the lining ring 6. The plurality of actuators 2 are arranged on an outer circle of the buffer layer 5. The actuators 2 are fixed on the annular box body reaction frame 1. Each actuator 2 includes a loading cushion block 2-3 and a driving device. Two sides of each loading cushion block 2-3 are gomphodont parts. Adjacent loading cushion blocks 2-3 are plugged to each other through the gomphodont parts. The driving devices drive the loading cushion blocks to load the buffer layer. The driving devices are fixed on the annular box body reaction frame. The driving devices are connected with a control system 100. Two sides of each loading cushion block 2-3 are gomphodont parts. Adjacent loading cushion blocks 2-3 are plugged to each other through the gomphodont parts. The driving devices drive the loading cushion blocks to load the buffer layer. The driving devices are fixed on the annular box body reaction frame. The driving devices are connected with a control system.

Figure 5:
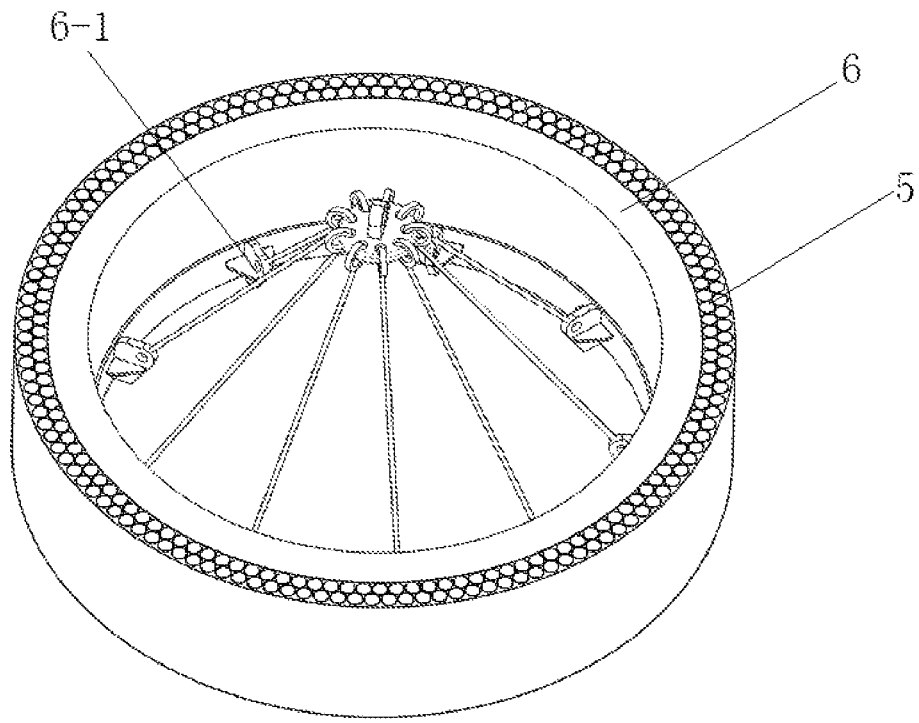
FIG. 5 is a schematic structural diagram of the entire lining ring in a hoisting state.
Figure 6:
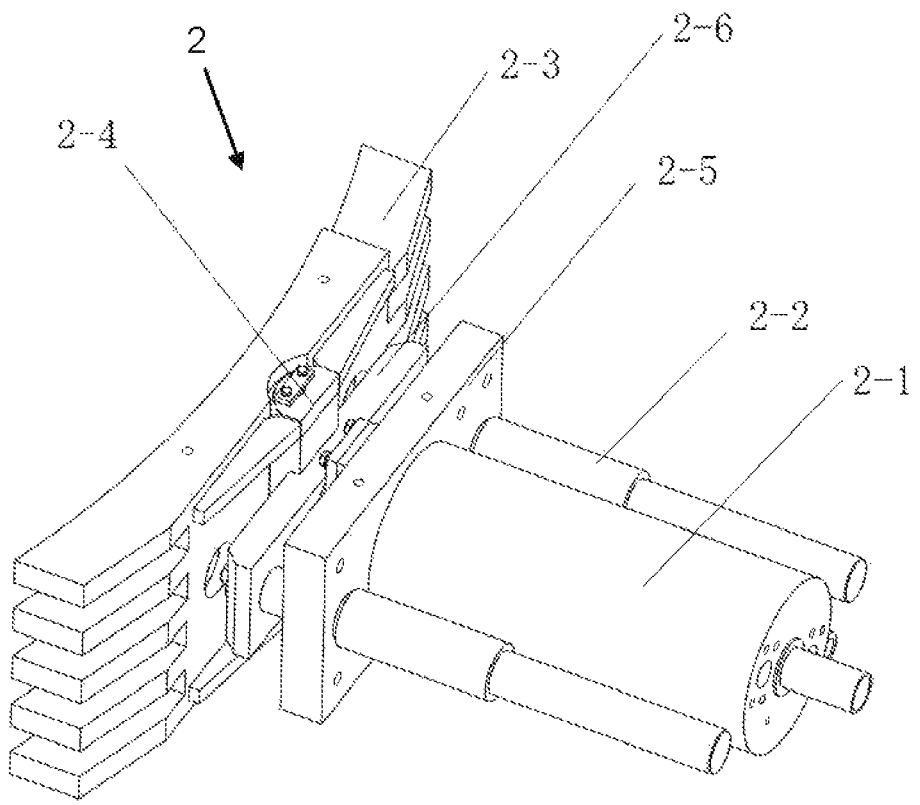
FIG. 6 is a schematic structural diagram of an actuator.
Figure 7:
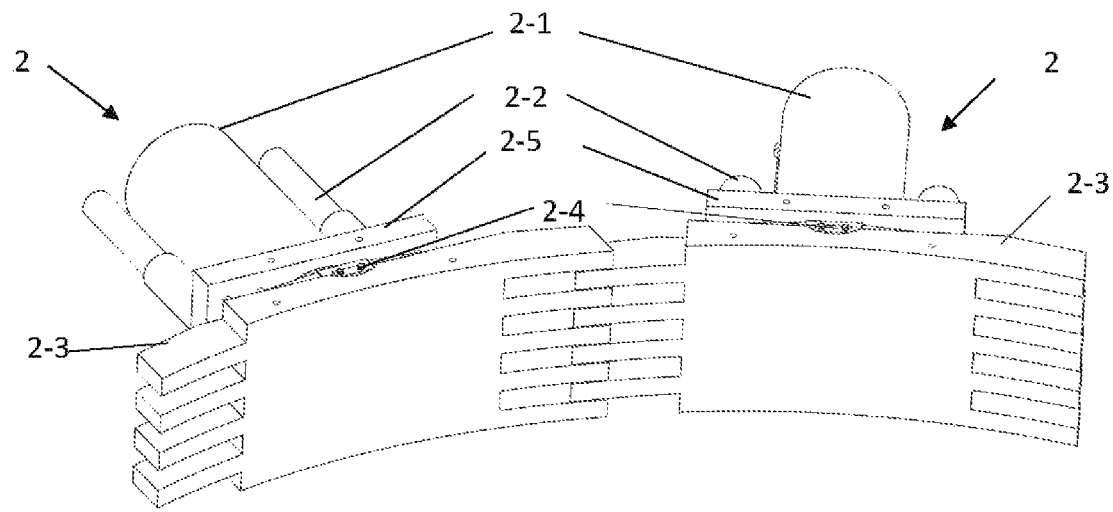
FIG. 7 is a schematic structural diagram of adjacent actuators in a plugging state.
Figure 8:
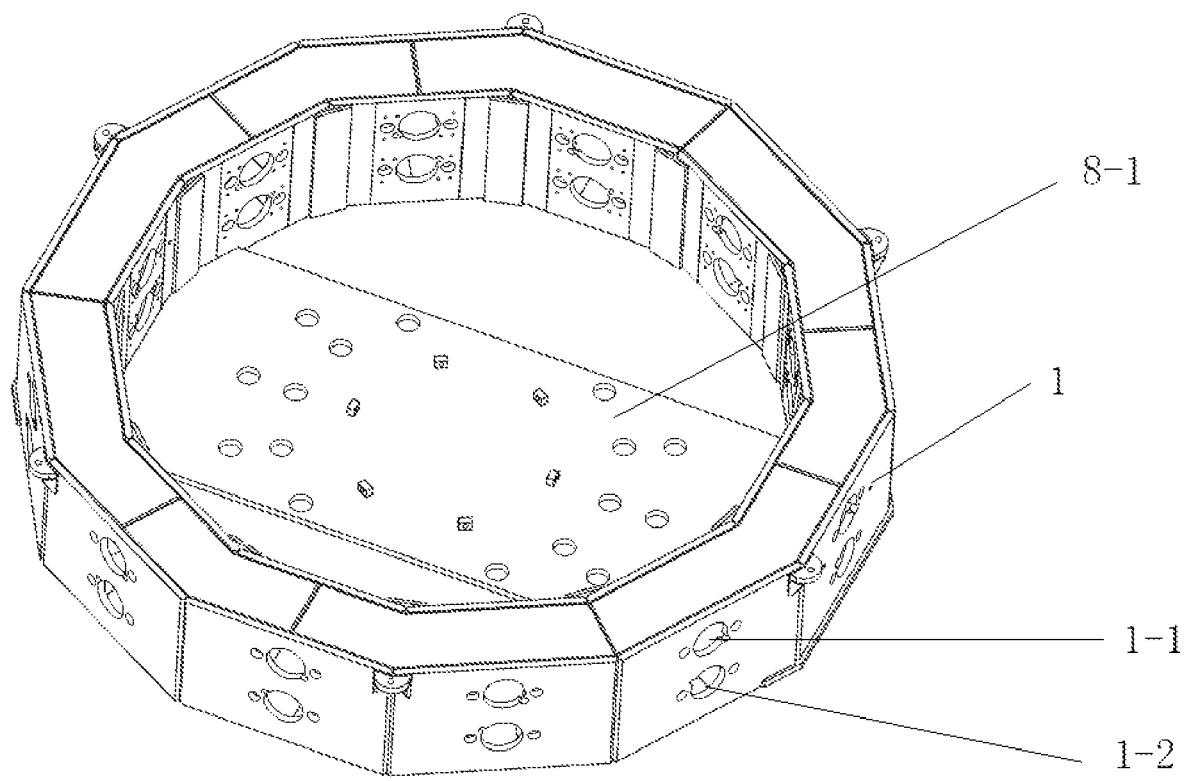
FIG. 8 is a schematic structural diagram of an annular box body reaction frame.

The above lining ring 6 is a permanent structure that supports and maintains long-term stability and durability of a tunnel, and is a test sample of this test system. During casting and fabrication of the lining ring, six threaded steel sleeves should be embedded into the lining ring, and the inner sides of the threaded steel sleeves are welded with steel bars inside the lining ring to ensure secure pre-embedding. Universal lifting rings 6-1 are mounted outside the sleeves. Six slings with equal lengths are used for hoisting the lining ring, and an included angle of the slings is about 80°, as shown in FIG. 5.

Figure 2:
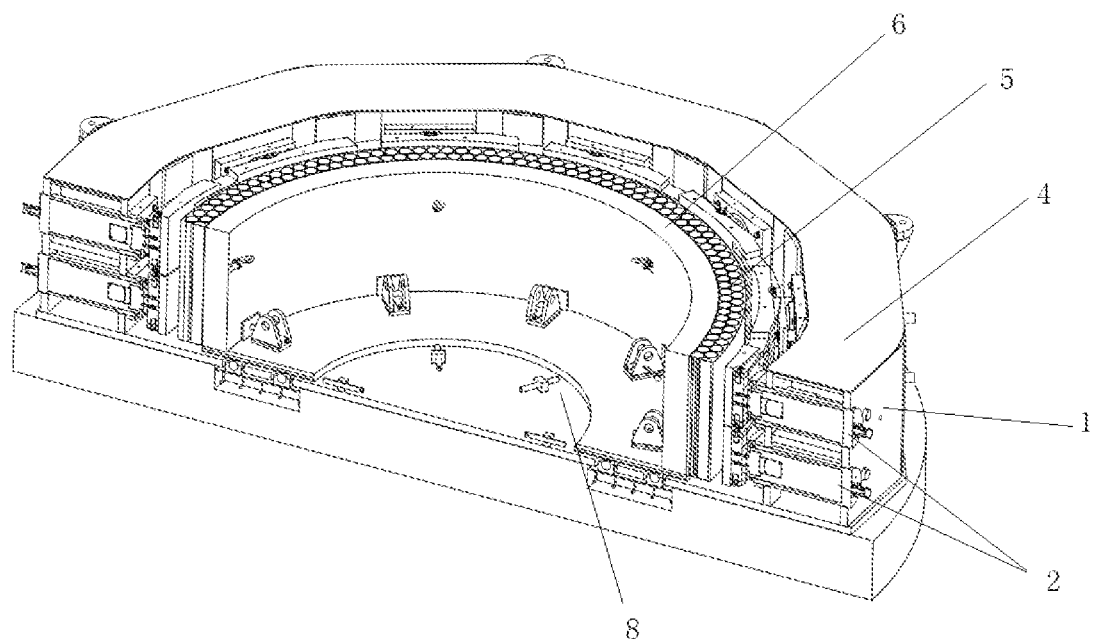
FIG. 2 and FIG. 3 are schematic diagrams of sectional structures of the present disclosure.
Figure 3:
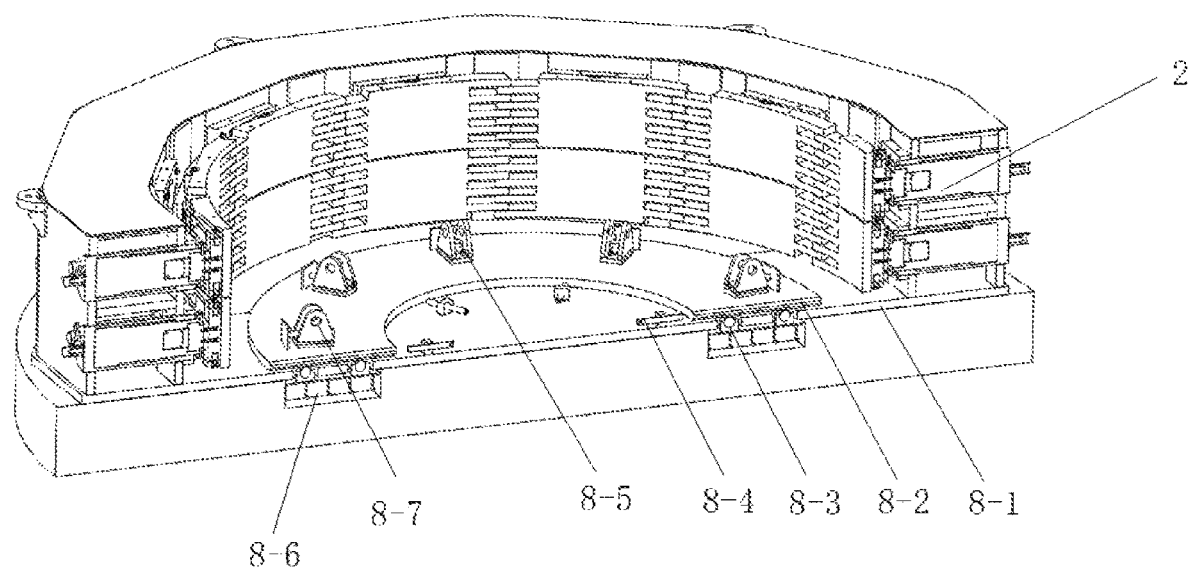
Figure 4:
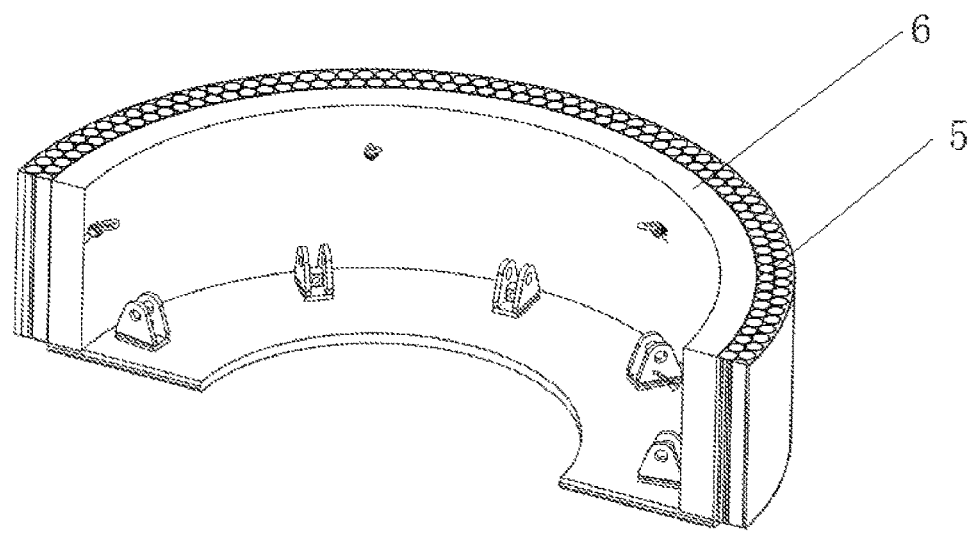
FIG. 4 is a schematic structural diagram of a lining ring and a buffer layer.

The annular box body reaction frame 1 in this embodiment is shown in FIG. 2. It is designed as an annular box body structure, which converts a reacting force from the test sample in a loading process into an internal force of the whole, so that a stress on a foundation is small. The annular box body reaction frame 1 is divided into three portions, each of which is composed of four smallest units. After arriving at a laboratory, the three portions can be assembled and welded into a whole. A size of each portion satisfies conditions for transportation of a truck and entry into the laboratory. The annular box body reaction frame in this embodiment is welded by high-quality high-tensile structural steel and materials with high welding performance, with reasonable structural layout and staggered. Moreover, plates are added to important sites for reinforcement, which improves the reliability of the welding lines.

Further, an upper layer of actuator mounting holes and a lower layer of actuator mounting holes are formed in the annular box body reaction frame 1. Each mounting hole is provided with one actuator. The upper and lower layers of actuators perform corresponding loading on the lining ring 6. In this embodiment, the test system includes 24 actuators, which are divided into upper and lower layers, 12 in each layer.

Further, the driving device of each actuator uses an oil cylinder 2-1 (an example of a driving device), and is internally provided with a displacement sensor. Force sensors are additionally arranged inside the oil cylinders with impact loading functions. An applied load of each actuator is indirectly calculated from an oil pressure. The force sensors can partially improve the measurement accuracy and compare forces with the results obtained by calculation from the oil pressure to correct measurement data. A feeding stroke of the oil cylinder 2-1 in this embodiment may be 350 mm. When the oil cylinders contract to a limit, a clearance between the loading cushion blocks 2-3 and the buffer layer 5 is 100 mm. When the oil cylinders extend to a limit, the oil cylinder with an impact function extends out of the buffer layer by 100 mm, and the remaining oil cylinders extend out of the buffer layer by 50 mm.

Further, a loading surface (front surface) of each loading cushion block 2-3 in this embodiment is a curved surface; and a curvature of the curved surface is equal to an average value of an initial curvature of the buffer layer and a predicted curvature after ultimate compression deformation. A surface (back surface), opposite to the loading surface, of each loading cushion block 2-3 is connected with the oil cylinder 2-1 through a spherical cylinder. Two sides of the oil cylinder 2-1 are provided with guide rods 2-2 for guiding a loading direction of the actuator.

Further, a front end of the oil cylinder 2-1 is connected to the loading cushion block 2-3 in a spherical hinge form. Under the action of the guiding devices, the test sample is loaded. In the loading process, the loading cushion block allows for self-adjustment of the loading direction in response to non-uniform deformation of the lining ring, with a swing range of ±6°. As a result, close contact is always maintained between the test sample and loading surface.

In this embodiment, each actuator uses an oil pressure of each oil cylinder to calculate a loading force, and 24 force sensors are additionally arranged to partially improve the measurement accuracy, and compare forces with data calculated using the oil pressures to correct measurement data.

The loading cushion blocks in this embodiment adopt a uniquely designed "gomphodont" structure to adapt to the characteristic of inward contraction deformation of the annular buffer layer structure during compression and to realize seamless connection of the loading cushion blocks. The "gomphodont" structure can meet the requirements for uniform loading, biased loading, and long-term loading. The loading cushion blocks will not be separated from or interfered with each other at two limiting positions of the oil cylinders. The "teeth" have reasonable clearances and move smoothly with a lubricant under the guidance of the guiding devices.

Further, in this embodiment, when the actuators perform biased loading, a tangential load will be generated between part of the loading cushion blocks and the buffer layer, which is equivalent to increasing a certain load. Therefore, in this embodiment, a swingable actuator is provided, through which, the loading cushion blocks can rotate with an outer contour of the buffer layer during the biased loading, without adding an additional load caused by the tangential load. A limiting device can limit a maximum swing angle of each loading cushion block, with a swing range of ±6° to ensure the safety of a mechanism. Each actuator is provided with a piston rod guide rod to ensure that a piston rod of the oil cylinder can only extend and retract, but not rotate.

Further, the floating platform 8 in this embodiment includes a top plate 8-2 and a bottom plate 8-1. Several universal balls 8-3 are inlaid in the bottom plate 8-1. The top plate 8-2 is supported by the several universal balls 8-3 to fix the lining ring. The buffer layer and the annular box body reaction frame are fixed at a periphery of 8-2. The universal balls 8-3 are fixed on a universal ball welding plate 8-6. The universal ball welding plate 8-6 is fixed in a groove of the foundation. The universal ball welding plate 8-6 is of an annular structure. A top plate alignment device is also provided on the bottom plate. The top plate alignment device drives the top plate to move relative to the bottom plate to achieve alignment. A lining ring alignment device is also provided on the top plate. The lining ring alignment device aligns the lining ring.

Further, the top plate alignment device in this embodiment is a lead screw driving device.

Further, the bottom plate 8-1 is a rectangular plate fixed at a bottom of the annular box body reaction frame. The bottom plate 8-1 is arranged in one direction of the bottom of the annular box body reaction frame. In the biased loading test, a direction with relatively high load should be consistent with a lengthwise direction of the bottom plate 8-1.

Further, the lining ring in this embodiment is placed on the top plate supported by the plurality of universal balls. The test sample remains floating in the loading process, which ensures that a friction force caused by a self-weight factor of the test sample does not affect test results, making the test more accurate. The buffer layer 5 is not in direct contact with the top plate of the follow-up hoisting platform, with a certain space reserved, to ensure that the buffer layer will not interact with the platform in case of axial expansion to a certain extent under radial compression.

Further, a lifting lug is also arranged on the top plate to hoist the lining ring and the top plate together.

Further, a circle of lining ring alignment device is arranged on the top plate. The lining ring alignment device includes a mounting seat. A lead screw adjustment device is arranged on the mounting seat. At the beginning of the test, the test sample can be aligned through the lead screw adjustment device and calibrated through marking lines. During the hoisting of the test sample, to avoid platform following, the top plate can be aligned through the lead screw adjustment device and locked. Further, a limiting column may also be arranged on the follow-up hoisting platform. The limiting column is used for limiting a maximum floating amount of the platform to ensure the safety of the test.

Further, the lining ring in this embodiment is also provided with a lifting lug to facilitate the hoisting of the lining ring.

Further, the test system in this embodiment is also provided with an annular inspection and protection platform and ladders. It is convenient for operators to carry out operations and inspections. A guardrail height of the inspection and protection platform is designed in accordance with the requirements of relevant standards.

Further, in the design of the inspection and protection platform in this embodiment, a crocodile mouth anti-skid plate is used for increasing the skid resistance of the platform, thereby improving the work safety. The ladders and the inspection and protection platform are fixed by bolts in a detachable manner. An inner ladder is quick-release. Therefore, the inner ladder can be removed during the hoisting of the test sample and installed after the hoisting. The curvature of the inner ladder allows it to have a sufficient distance from the test sample, thereby not affecting the test.

Finally, it should be noted that the relational terms such as first and second are used only to differentiate an entity or operation from another entity or operation, and do not require or imply any actual relationship or order between these entities or operations.

The foregoing descriptions are merely preferred embodiments of the present disclosure, but are not intended to limit the present disclosure. A person skilled in the art may make various alterations and variations to the present disclosure. Any modification, equivalent replacement, or improvement made and the like within the spirit and principle of the present disclosure shall fall within the protection scope of the present disclosure.

What is claimed is:

1. A deformation and control simulation test system for a tunnel engineering supporting structure, wherein the deformation and control simulation test system is of a horizontal structure, comprising:
    a floating platform;
    a plurality of actuators arranged at a periphery of the floating platform, each actuator comprising
        a loading cushion block, wherein
            two sides of each loading cushion block are gomphodont parts;
            adjacent loading cushion blocks are plugged to each other through the gomphodont parts;
        a driving device, wherein
            the driving devices drive the loading cushion blocks to load a lining ring;
            the driving devices are fixed on an annular box body reaction frame; and
            the driving devices are connected with a control system.

2. The deformation and control simulation test system for a tunnel engineering supporting structure according to claim 1, wherein a loading surface of each loading cushion block is a curved surface; and a curvature of the curved surface is equal to an average value of an initial curvature of the lining ring and a predicted curvature after ultimate compression deformation.

3. The deformation and control simulation test system for a tunnel engineering supporting structure according to claim 1, wherein a surface, opposite to the loading surface, of each loading cushion block is connected with an output end of each driving device through a spherical hinge.

4. The deformation and control simulation test system for a tunnel engineering supporting structure according to claim 1, wherein two sides of each driving device are provided with guide rods for guiding a loading direction of the driving device.

5. The deformation and control simulation test system for a tunnel engineering supporting structure according to claim 4, wherein the driving device is a hydraulic driving device or a pneumatic driving device.

6. The deformation and control simulation test system for a tunnel engineering supporting structure according to claim 1, wherein the annular box body reaction frame comprises:
    a plurality of portions, wherein adjacent portions are welded together; and
    actuator mounting holes are reserved in the portions.

7. The deformation and control simulation test system for a tunnel engineering supporting structure according to claim 1, wherein the floating platform comprises:
    a top plate, wherein
        the top plate is supported by several universal balls; and
        the top plate is used for preparing, transferring, and bearing the lining ring; and
    a bottom plate, wherein the several universal balls are inlaid in the bottom plate.

8. The deformation and control simulation test system for a tunnel engineering supporting structure according to claim 7, wherein a top plate alignment device is also arranged on the bottom plate.

9. The deformation and control simulation test system for a tunnel engineering supporting structure according to claim 7, wherein a lining ring alignment device is also arranged on the top plate.

10. The deformation and control simulation test system for a tunnel engineering supporting structure according to claim 7, wherein
    the control system can realize uniform loading, non-uniform loading, and long-term loading functions; and
    the control system can achieve independent displacement or force loading control on the plurality of actuators by means of programming.

* * * * *